United States Patent
Zhang et al.

(10) Patent No.: US 12,003,888 B2
(45) Date of Patent: Jun. 4, 2024

(54) VIDEO CALL SWITCHING METHOD, STORAGE MEDIUM AND TERMINAL

(71) Applicant: HUIZHOU TCL MOBILE COMMUNICATION CO., LTD, Guangdong (CN)

(72) Inventors: Junjie Zhang, Guangdong (CN); Hai Cai, Guangdong (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 78 days.

(21) Appl. No.: 17/759,089

(22) PCT Filed: Feb. 19, 2020

(86) PCT No.: PCT/CN2020/075822
§ 371 (c)(1),
(2) Date: Jul. 19, 2022

(87) PCT Pub. No.: WO2021/142875
PCT Pub. Date: Jul. 22, 2021

(65) Prior Publication Data
US 2023/0039225 A1    Feb. 9, 2023

(30) Foreign Application Priority Data
Jan. 19, 2020 (CN) .......................... 202010057490.4

(51) Int. Cl.
*H04N 7/14* (2006.01)
*H04L 65/1069* (2022.01)

(52) U.S. Cl.
CPC ......... *H04N 7/147* (2013.01); *H04L 65/1069* (2013.01)

(58) Field of Classification Search
CPC ........................... H04N 7/147; H04L 65/1069
See application file for complete search history.

(56) References Cited

U.S. PATENT DOCUMENTS

| | | | |
|---|---|---|---|
| 6,907,004 B1 * | 6/2005 | Ramsey | H04L 65/104 370/468 |
| 9,686,497 B1 | 6/2017 | Terry | |
| 2014/0333713 A1 * | 11/2014 | Shoemake | H04M 7/0045 348/14.05 |

FOREIGN PATENT DOCUMENTS

| | | |
|---|---|---|
| CN | 101094130 A | 12/2007 |
| CN | 101729555 A | 6/2010 |

(Continued)

OTHER PUBLICATIONS

International Search Report in International application No. PCT/CN2020/075822, mailed on Oct. 13, 2020.

(Continued)

*Primary Examiner* — Amal S Zenati
(74) *Attorney, Agent, or Firm* — PV IP PC; Wei Te Chung; Zhigang Ma

(57) ABSTRACT

Disclosed are a video call switching method, a storage medium and a terminal. The method comprises: upon receiving a video call request initiated by a caller terminal and in a video call state, acquiring a first communication type of the current video call and a second communication type of a video call initiated by the caller terminal; if the first communication type is different from the second communication type, giving a prompt of the video call request initiated by the caller terminal; and when a response operation for the video call request is received, switching the current video call to the video call of the second communication type.

17 Claims, 5 Drawing Sheets

(56) References Cited

FOREIGN PATENT DOCUMENTS

| | | |
|---|---|---|
| CN | 102083030 A | 6/2011 |
| CN | 108063908 A | 5/2018 |

OTHER PUBLICATIONS

Written Opinion of the International Search Authority in International application No. PCT/CN2020/075822, mailed on Oct. 13, 2020.

Chinese Office Action issued in corresponding Patent Application No. 202010057490.4 dated Nov. 4, 2020, pp. 1-7.

* cited by examiner

VIDEO CALL SWITCHING METHOD, STORAGE MEDIUM AND TERMINAL

CROSS REFERENCE

This application is a US national phase application based upon an International Application No. PCT/CN2020/075822, filed on Feb. 19, 2020, which claims the priority of Chinese Patent Application No. 202010057490.4, entitled "VIDEO CALL SWITCHING METHOD, STORAGE MEDIUM AND TERMINAL", filed on Jan. 19, 2020, the disclosure of which is incorporated herein by reference in its entirety.

FIELD OF THE DISCLOSURE

The present disclosure relates to a terminal technology, in particular, to a video call switching method, a storage medium and a terminal.

BACKGROUND

With the global popularity of 4G high-speed networks and the gradual development of 5G networks, network video calls based on Over The Top (OTT) have been rapidly developed. The OTT network video calls, together with traditional video calls (such as CS video calls on 3G networks and Video over Long-term Evolution (ViLTE) video call schemes for IP Multimedia Subsystem (IMS) on 4G networks, are common for users to make video calls.

Conventionally, the above-mentioned two types of video calls have obvious conflicts and poor experiences in users' daily use, resulting in users being unable to effectively connect video calls according to their needs.

SUMMARY

Technical Problem

One objective of an embodiment of the present disclosure is to provide a video call switching method, a storage medium and a terminal to improve the effectiveness and practicability of the video calls.

Technical Solution

According to an embodiment of the present disclosure, a video call switching method, used in a terminal, is disclosed. The video call switching method comprises: under a condition that a request of a video call initiated by a calling terminal is received, detecting whether a current terminal is in a video calling state; under a condition that the current terminal is in the video calling state, obtaining a first communication type of a current video call and a second communication type of the video call initiated by the calling terminal; under a condition that the first communication type is different from the second communication type, then generating a prompt message on a current call interface, wherein the prompt message is configured to prompt the request of the video call initiated by the calling terminal; and under a condition that a response operation to the request of the video call is received, switching a current video call to a video call of the second communication type to establish a video call connection with the call terminal.

In some embodiments, the step of detecting whether the current terminal is in the video calling state comprises:

obtaining a video call status table within a specified storage area, wherein the video call status table at least comprises: a video call type and its current call status;

iterating over the call status of each type of video call in the video call status table to determine whether the current terminal is in the video call state.

In some embodiments, the video call switching method further comprises following steps after the step of switching the current video call to the video call of the second communication type:

determining the call status in the video call status table as a target video call being in a calling state;

updating the call status of the target video call to being not in a calling state, and updating the call status of the switched current video call as being in a calling state.

In some embodiments, the step of switching the current video call to the video call of the second calling type comprises:

maintaining a communication connection of the current video call with an opposite terminal, and stopping a call data transmission with the opposite terminal, wherein the call data comprise at least voice data and image data; and receiving the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

In some embodiments, the video call switching method further comprises:

after detecting that the video call of the second communication type is completed, enabling the call data transmission with the opposite terminal and displaying the image data transmitted by the opposite terminal on the display screen.

In some embodiments, the communication type of the video call comprises:

a communication type based on a voice channel and a communication type based on a data channel.

According to another embodiment of the present disclosure, a video call switching device is disclosed. The video call switching device comprises: a detecting unit, configured to detect whether a current terminal is in a video calling state under a condition that a request of a video call initiated by a calling terminal is received; an obtaining unit configured to obtain a first communication type of a current video call and a second communication type of the video call initiated by the calling terminal under a condition that the current terminal is in the video calling state; a prompting unit, configured to generate a prompt message on a current call interface, wherein the prompt message is configured to prompt the request of the video call initiated by the calling terminal under a condition that the first communication type is different from the second communication type; and a switching unit, configured to switch a current video call to a video call of the second communication type to establish a video call connection with the call terminal under a condition that a response operation to the request of the video call is received.

In some embodiments, the detecting unit is further configured to obtain a video call status table within a specified storage area. The video call status table comprises a video call type and its current call status.

The detecting unit is further configured to iterate over the call status of each type of video call in the video call status table to determine whether the current terminal is in the video call state.

In some embodiments, the video call switching device further comprises a determining unit and a updating unit.

The determining unit is configured to determine the call status in the video call status table as a target video call being in a calling state after the current video call is switched to the video call of the second communication type.

The updating unit is configured to update the call status of the target video call to not being a calling state, and update the call status of the switched current video call as being in a calling state.

In some embodiments, the switching unit is configured to maintain a communication connection of the current video call with an opposite terminal, and to stop a call data transmission with the opposite terminal, wherein the call data comprise at least voice data and image data.

The switching unit is further configured to receive the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

In some embodiments, the video call switching device further comprises a processing unit, configured to start the call data transmission with the opposite terminal, display the image data transmitted by the opposite terminal on the display screen, and play voice data transmitted by the opposite terminal through the speaker after the video call of the second communication type is detected to be completed.

In some embodiments, the communication type of the video call comprises a communication type based on a voice channel and a communication type based on a data channel.

According to still another embodiment of the present disclosure, a computer-readable storage medium is disclosed. The computer-readable storage medium stores a plurality of instructions, where the instructions are executed by a processor to perform the aforementioned video call switching method.

According to yet another embodiment of the present disclosure, a terminal is disclosed. The terminal comprises a processor and a memory. The memory is electrically connected to the processor and is configured to store instructions and data. The processor is configured to perform the aforementioned video call switching method.

Advantageous Effect

Embodiments of the present disclosure are directed to a video call switching method, a storage medium and a terminal to improve the effectiveness and practicability of the video calls.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

Figure 1:
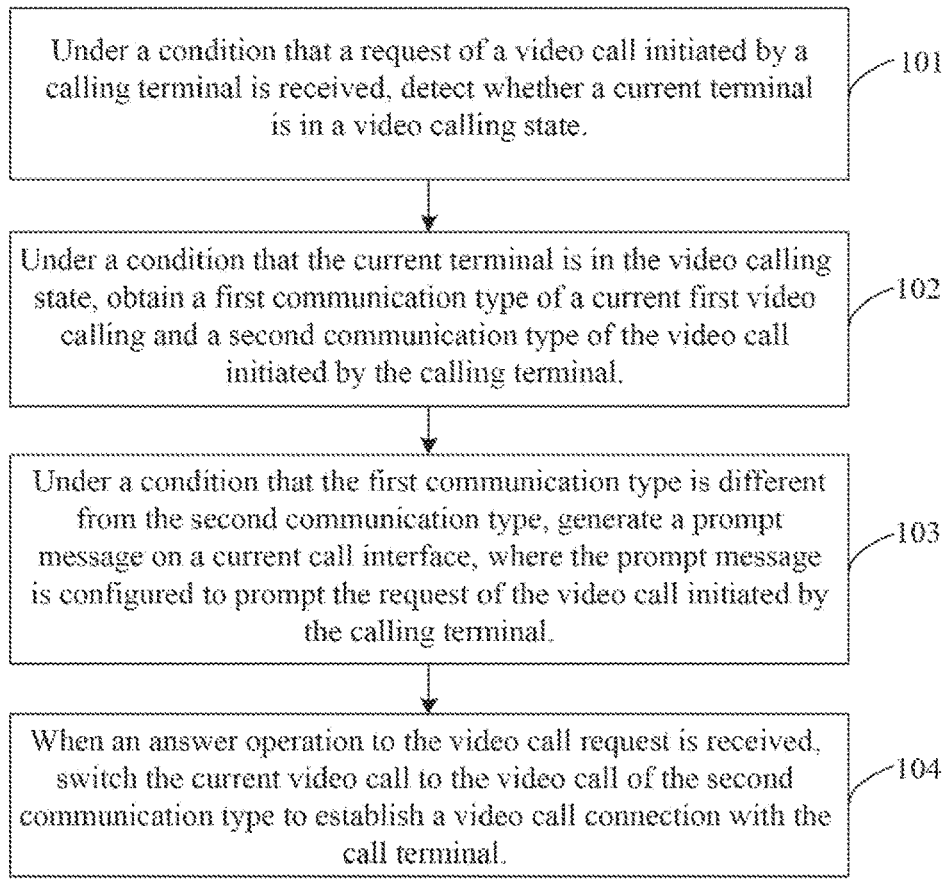
FIG. 1 is a flow chart of a video call switching method according to an embodiment of the present disclosure.

The disclosure is described below in detail with reference to the accompanying drawings, wherein like reference numerals are used to identify like elements illustrated in one or more of the figures thereof, and in which exemplary embodiments of the disclosure are shown. This disclosure may, however, be embodied in many different forms and should not be construed as limited to the particular embodiments set forth herein. Rather, these embodiments are provided so that this disclosure will be thorough and complete, and will fully convey the scope of the disclosure to those skilled in the art.

According to an embodiment of the present disclosure, a video call switching method, a storage medium and a terminal are disclosed. In the following disclosure, they will be illustrated in detail.

According to an embodiment of the present disclosure, a video call switching method, used in a smart phone, a tablet, and/or a laptop, is disclosed. Please refer to FIG. 1. The video call switching method could comprise following steps:

Step 101: Under a condition that a request of a video call initiated by a calling terminal is received, detecting whether a current terminal is in a video calling state.

The video call status refers to a status that the terminal and an opposite terminal are in the video call with the image and screen data interaction (there is not limitation on their properties). In this embodiment, the corresponding call status could be recorded for different types of video calls. That is, the step of detecting whether you are currently in a video call state comprises following steps:

(11) obtaining a video call status table in the specified storage area, wherein the video call status table comprises at least: the video call type and its current call status;

(12) Traversing the call status of each type of video calls in the video call status table to determine whether the current terminal is in the video call state.

Here, the video call type can be determined based on different communication technologies, such as video calls based on 4G communication technology or video calls based on 5G communication technology. In addition, it can also be determined based on different software or hardware call mechanisms, such as video calls through the video call function integrated by an application APP1 or video calls through the video call function integrated by an application APP2.

In the actual implementations, call status information of each video call could be recorded in a table. For example, a video call status data sheet can be maintained in the system, as shown in Table 1 below:

TABLE 1

| Video call type | Corresponds to the dial module | Whether the call is currently in progress |
| --- | --- | --- |
| CS video | Phone dialer | No |
| ViLTE video | ViLTE dialer | No |
| OTT Video (APP1) | Video over IP application (APP1) | No |
| OTT Video (APP2) | Video over IP application (APP2) | Yes |
| ... | ... | ... |

Whenever the terminal installs a type of video calling application, a new row is added to complete the database. Every time when a video call is activated and continued, the status "Yes" is marked in the database.

In the step of detecting whether the terminal is in the call state, the terminal could find out if any type of video call is in the call state by traversing the video call status data table such that the call status of the current terminal could be determined.

Step 102: Under a condition that the current terminal is in the video calling state, obtaining a first communication type of a current first video calling and a second communication type of the video call initiated by the calling terminal.

The communication type of the video call comprises: a communication type based on the audio channel and a communication type based on the data channel. For example, CS video calls based on 3G networks and ViLTE video calls based on IMS under 4G networks could be categorized as the voice channel-based communication types; and IP video calls based on WiFi networks or high-speed networks such as 4G and 5G networks, using application software can be categorized as data channel-based communication types.

When the current terminal is determined to be in the calling state, the first communication type of the current video call can be determined by the relevant type information of the current video call and the call module information based on it in the above video call status data table. Furthermore, the video call could be determined based on the video call request initiated by the call terminal and the relevant type information of the video call and the call module information based on it could be found out from the above-mentioned video call status data table to determine the second communication type of the video call.

Step 103: Under a condition that the first communication type is different from the second communication type, generating a prompt message on a current call interface, wherein the prompt message is configured to prompt the request of the video call initiated by the calling terminal.

If the communication type of the video call initiated by the call terminal is different from the communication type of the current video call, a prompt message is generated on the video interface of the current video call to prompt the user that there are currently other types of video calls called in, so that the user could be acknowledged and selectively answer instead of directly hanging up the current video call and switching the current video call to the incoming video call.

The prompt message could comprise the call identification of the call terminal (such as a note name, a communication number, etc.), video call type and/or other information, and operable response controls (such as answer control and hang up control). In the actual implementation, the prompt message can be displayed only in the partial area of the current call interface. For example, the video call information could be only displayed in the top area of the current call interface.

Step 104: When an answer operation to the video call request is received, switching the current video call to the video call of the second communication type to establish a video call connection with the call terminal.

After the prompt message is displayed in the current video call interface, the user can perform a response operation in respond to the prompt message to answer or hang up the video call. For example, the user can perform a corresponding operation by tapping the answer control or hang-up control shown in the prompt message.

When the answer operation of the user in response to the video call request is received, the video call of the second communication type is connected such that a video call connection with the call terminal is established.

After the current video call is switched to a video call of the second communication type, the video call switching method could further comprise following steps:

determining the call status in the video call status table as a target video call being busy; and updating the call status of the target video call to not busy, and update the call status of the switched current video call as busy.

Specifically, after the video call is switched, a data update operation needs to be performed on the above-mentioned video call data table according to the current status of each type of video call to maintain the stability of the video call data table. The step of switching the current video call to a video call of the second communication type could comprise following steps:

(21) maintaining a communication connection of the current video call with an opposite terminal, and stopping a call data transmission with the opposite terminal, wherein the call data comprise at least voice data and image data.

(22) receiving the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

In this embodiment, when detecting the user's response to the video call request of the current call terminal, the connection between the dial module corresponding to the current video call and the multimedia framework/the multimedia interface layer is disconnected such that the current video call is not disconnected and the data interaction with the other terminal, including voice data and image data, is prohibited. At the same time, the video call of the second communication type is connected and the connection between the dial module corresponding to the video call and the multimedia framework/the multimedia interface layer is established. Furthermore, the terminal camera, the display screen, the microphone, the speaker and other devices are driven to perform the external image acquisition, the image display, the sound signal acquisition and the audio data playback and other operations. In this way, the display screen could display the image data sent by the call terminal and the speaker could play the voice data sent by the call terminal while the image information collected by the terminal camera at this end is converted into the image data and the sound information collected by the microphone at this end is converted into the audio data and sent to the call terminal.

In some embodiments, when the video call of the second communication type is detected to be finished, the call data transmission with the other terminal begins, the image data transmitted by the other terminal is displayed on the display screen, and the voice data transmitted by the other terminal is played through the speaker.

When the video call of the second communication type is detected to be finished, the connection between the dial module corresponding to the original video call (that is, the video call of the first type) and the multimedia framework/ the multimedia interface layer is restored, and the terminal camera, the display screen, the microphone, he speaker and other devices are driven to perform the external image acquisition, the image display, the sound signal acquisition and the audio data playback and other operations. In this way, the display screen could display the image data sent by the call terminal and the speaker could play the voice data sent by the call terminal while the image information collected by the terminal camera at this end is converted into the image data and the sound information collected by the microphone at this end is converted into the audio data and sent to the call terminal.

In sum, the embodiment of the present disclosure is directed to a video call switching method used in a terminal. The video switching method detects whether a current terminal is in a video calling state under a condition that a request of a video call initiated by a calling terminal is received; obtains a first communication type of a current video call and a second communication type of the video call initiated by the calling terminal under a condition that the current terminal is in the video calling state; generates a prompt message on a current call interface, wherein the prompt message is configured to prompt the request of the video call initiated by the calling terminal under a condition that the first communication type is different from the second communication type; and switches a current video call to a video call of the second communication type to establish a video call connection with the call terminal under a condition that a response operation to the request of the video call is received. Accordingly, when a CS/ViLTE video call and an OTT video call appear at the same time, the user can freely select and switch, thereby improving the effectiveness and practicality of the video calls.

Figure 2A:
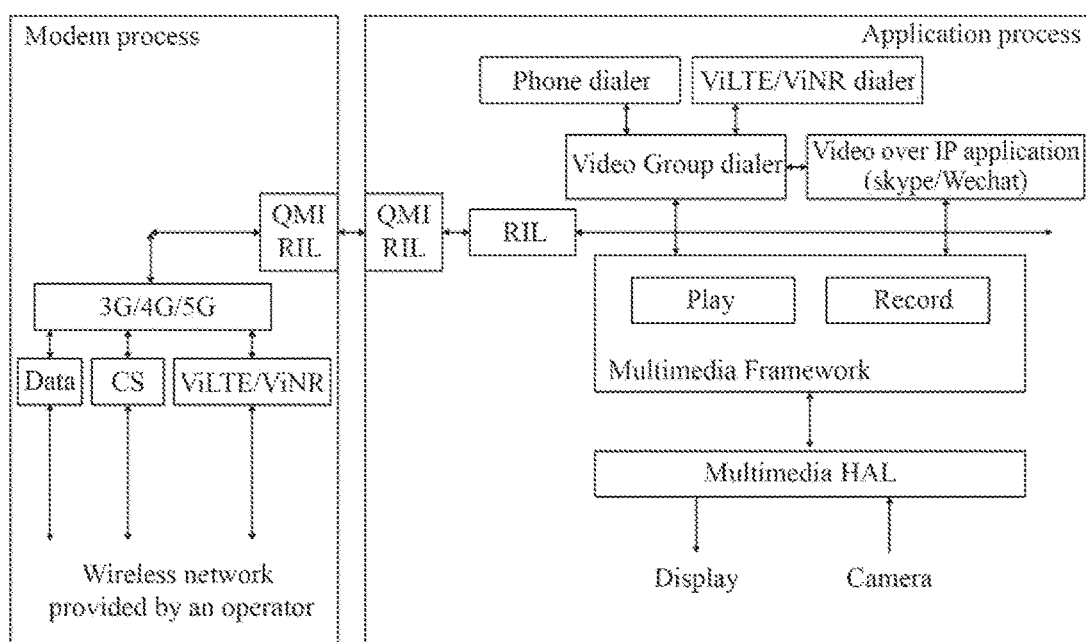
FIG. 2a is a diagram of a system architecture of a video call switching method according to an embodiment of the present disclosure.

In another embodiment, please refer to FIG. 2a. FIG. 2a is a diagram of a system architecture of a video call switching method according to an embodiment of the present disclosure. As shown in FIG. 2a, a communication mechanism needs to be established between the Video over IP application module and the video group dialer module to communicate and coordinate the conflict. In the following disclosure, the video call switching method will be described in detail using a scenario where an OTT video call request is received during a CS/ViLTE video call as an example.

Figure 2B:
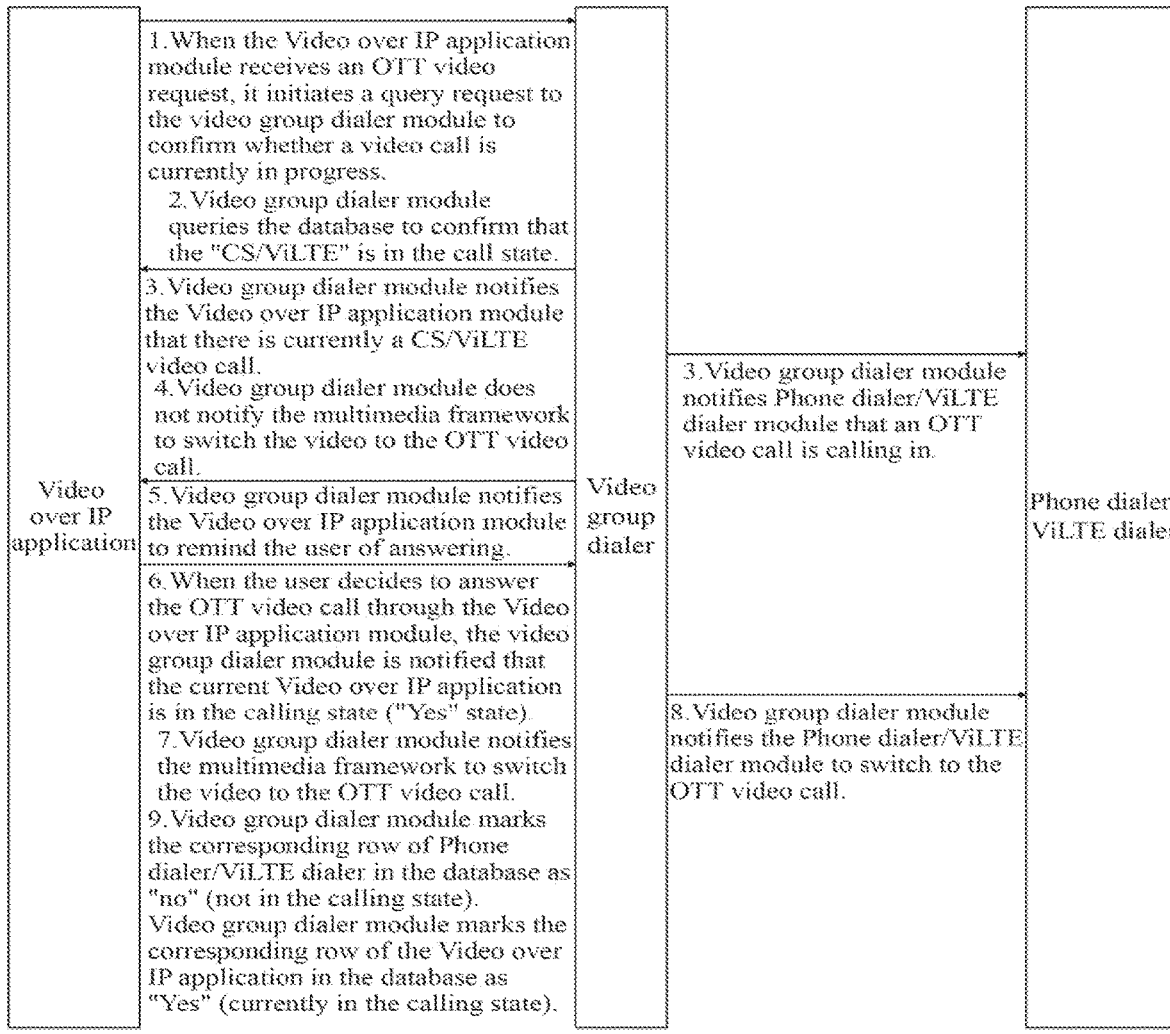
FIG. 2b is a diagram showing an application scenario of a video call switching method according to an embodiment of the present disclosure.

Please refer to FIG. 2b. When the Video over IP application module receives an OTT video request, it initiates a query request to the video group dialer module to confirm whether a video call is currently in progress. If the video group dialer module queries the database to confirm that the "CS/ViLTE" is in the call state, the video group dialer module will notify the Video over IP application module that there is currently a CS/ViLTE video call, notify the Phone dialer/ViLTE dialer module that an OTT video call is calling in, and trigger Video over IP application module to generate a prompt message to ask whether to answer the OTT video call. When the user decides to answer the OTT video call through the Video over IP application module, the video group dialer module is notified that the current Video over IP application is in the calling state ("Yes" state). The Video group dialer module notifies the multimedia framework to switch the video to the OTT video call and notifies the Phone dialer/ViLTE dialer module to switch to the OTT video call. Finally, the video group dialer module marks the corresponding row of Phone dialer/ViLTE dialer in the database as "no" (not in the calling state) and mark the corresponding row of the Video over IP application in the database as "Yes" (currently in the calling state).

Figure 2C:
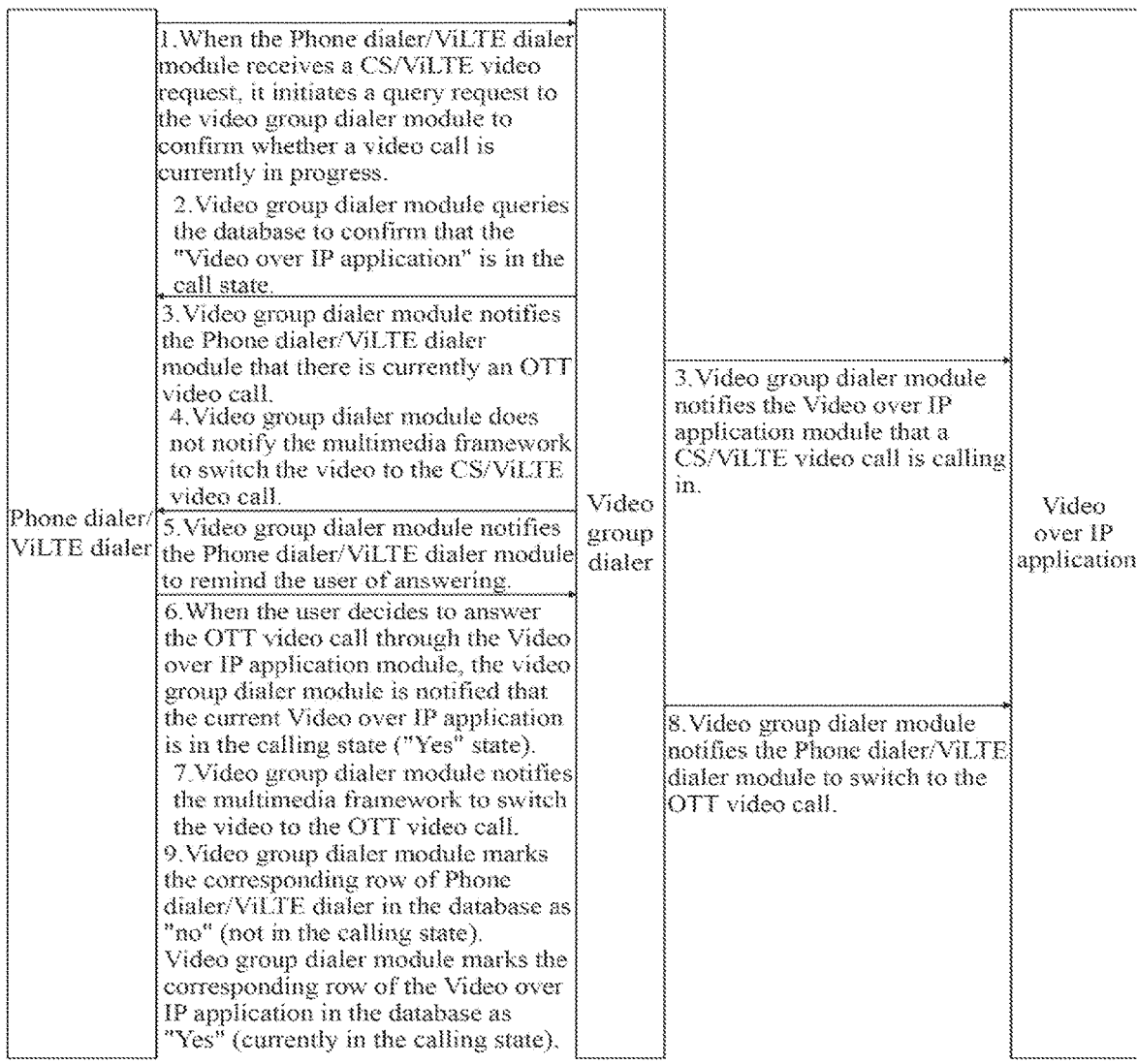
FIG. 2c is a diagram showing another application scenario of a video call switching method according to an embodiment of the present disclosure.

Please refer to FIG. 2c. In the following disclosure, the video call switching method will be described in detail using a scenario where a CS/ViLTE video request is received during an OTT video call as an example.

When the Phone dialer/ViLTE dialer module receives a CS/ViLTE video request, it initiates a query request to the video group dialer module to confirm whether a video call is currently in progress. If the video group dialer module queries the database to confirm that the "Video over IP application" is in the call state, the video group dialer module will notify the Phone dialer/ViLTE dialer module that there is currently an OTT video call, notify the Video over IP application module that a CS/ViLTE video call is calling in, and trigger the Phone dialer/ViLTE dialer module to generate a prompt message to ask whether to answer the CS/ViLTE video call. When the user decides to answer the CS/ViLTE video call through the Phone dialer/ViLTE dialer module, the video group dialer module is notified that the current Phone dialer/ViLTE dialer is in the calling state ("Yes" state). The Video group dialer module notifies the multimedia framework to switch the video to the CS/ViLTE video call and notifies the Phone dialer/ViLTE dialer module to switch to the CS/ViLTE video call. Finally, the video group dialer module marks the corresponding row of Phone dialer/ViLTE dialer in the database as "Yes" (currently in the calling state) and mark the corresponding row of the Video over IP application in the database as "No" (currently in the calling state).

This solution can handle the scenario when the CS/ViLTE video call and OTT video call occur at the same time, and allowing user to freely select and switch, so as to achieve a better user video call experience. Furthermore, this could avoid conventional issues where a CS/ViLTE video call may directly interrupt an OTT video call or the user may not receive a prompt message regarding the OTT video call.

Figure 3:
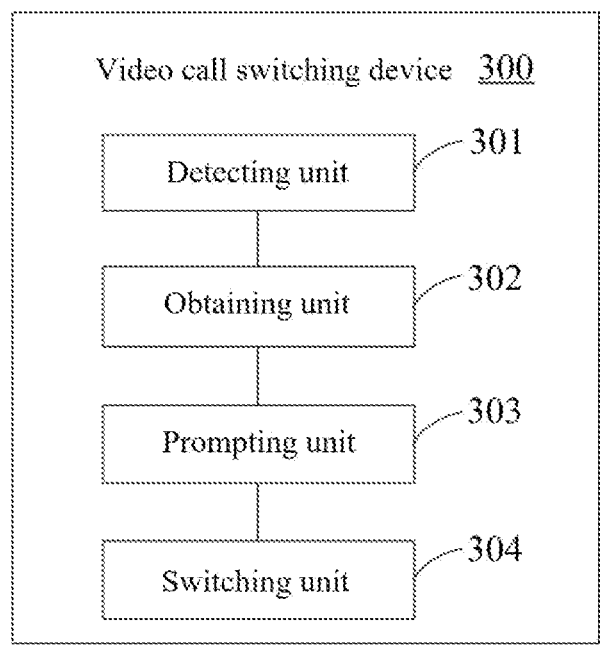
FIG. 3 is a diagram of a structure of a video call switching device according to an embodiment of the present disclosure.

According to another embodiment of the present disclosure, a video call switching device is disclosed. The video call switching device could be integrated in the form of software or hardware in the terminal. The terminal comprises a mobile phone, a tablet, a laptop and any other devices. As shown in FIG. 3, the video call switching device 300 comprises a detecting unit 301, an obtaining unit 302, a prompting unit 303 and a switching unit 304.

The detecting unit 301 is configured to detect whether a current terminal is in a video calling state under a condition that a request of a video call initiated by a calling terminal is received.

The obtaining unit is configured to obtain a first communication type of a current video call and a second communication type of the video call initiated by the calling terminal under a condition that the current terminal is in the video calling state.

The prompting unit 303 is configured to generate a prompt message on a current call interface, wherein the prompt message is configured to prompt the request of the video call initiated by the calling terminal under a condition that the first communication type is different from the second communication type.

The switching unit 304 is configured to switch a current video call to a video call of the second communication type to establish a video call connection with the call terminal under a condition that a response operation to the request of the video call is received.

The detecting unit 301 is further configured to obtain a video call status table within a specified storage area. The video call status table comprises a video call type and its current call status.

The detecting unit 301 is further configured to iterate over the call status of each type of video call in the video call status table to determine whether the current terminal is in the video call state.

Figure 4:
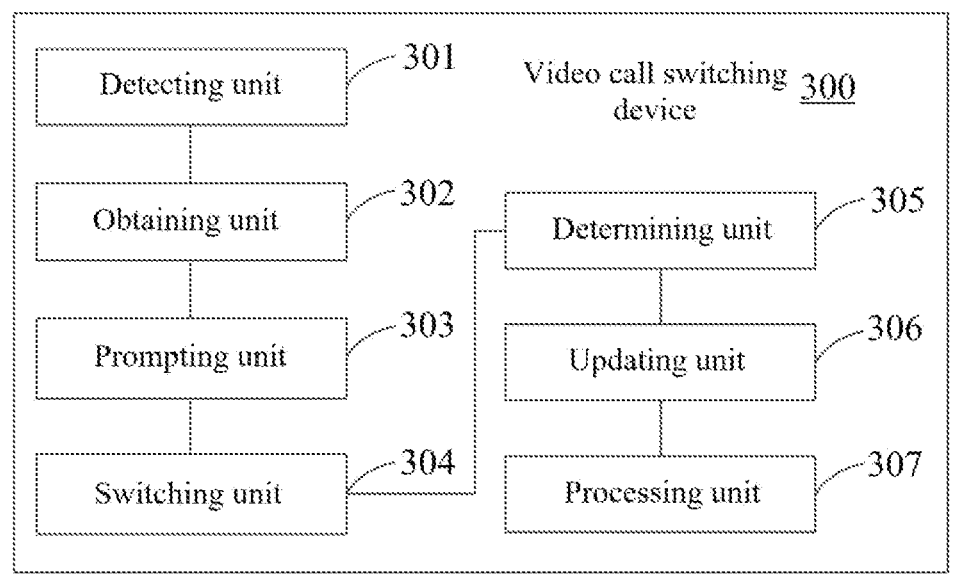
FIG. 4 is a diagram of another structure of a video call switching device according to an embodiment of the present disclosure.

Please refer to FIG. 4. The video call switching device 300 could further comprise a determining unit 305 and an updating unit 306.

The determining unit 305 is configured to determine the call status in the video call status table as a target video call being in a calling state after the current video call is switched to the video call of the second communication type.

The updating unit 306 is configured to update the call status of the target video call to not being a calling state, and update the call status of the switched current video call as being in a calling state.

The switching unit 304 is configured to maintain a communication connection of the current video call with an opposite terminal, and to stop a call data transmission with the opposite terminal, wherein the call data comprise at least voice data and image data.

The switching unit 304 is further configured to receive the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

The video call switching device 300 could further comprise a processing unit 307, configured to start the call data transmission with the opposite terminal, display the image data transmitted by the opposite terminal on the display screen, and play voice data transmitted by the opposite terminal through the speaker after the video call of the second communication type is detected to be completed.

The communication type of the video call comprises a communication type based on a voice channel and a communication type based on a data channel.

In sum, the embodiment of the present disclosure is directed to a video call switching device. The video switching device detects whether a current terminal is in a video calling state under a condition that a request of a video call initiated by a calling terminal is received; obtains a first communication type of a current video call and a second communication type of the video call initiated by the calling terminal under a condition that the current terminal is in the video calling state; generates a prompt message on a current call interface, wherein the prompt message is configured to prompt the request of the video call initiated by the calling terminal under a condition that the first communication type is different from the second communication type; and switches a current video call to a video call of the second communication type to establish a video call connection with the call terminal under a condition that a response operation to the request of the video call is received. Accordingly, when a CS/ViLTE video call and an OTT video call appear at the same time, the user can freely select and switch, thereby improving the effectiveness and practicality of the video calls.

Figure 5:
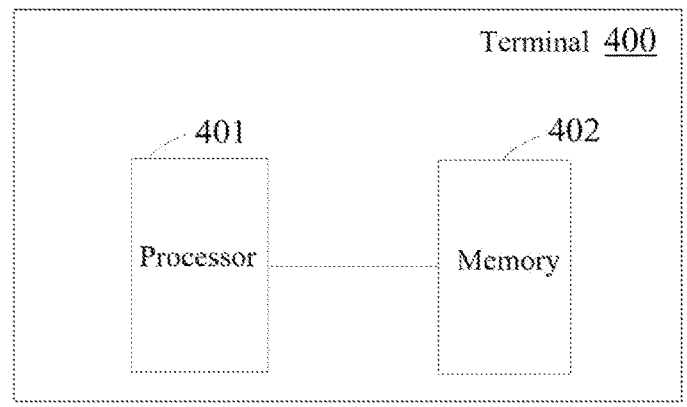
FIG. 5 is a diagram of a structure of a terminal according to an embodiment of the present disclosure.

According to another embodiment of the present disclosure, a terminal is disclosed. The terminal may be a smart phone, a tablet or any other terminal devices. As shown in FIG. 5, the terminal 400 comprises a processor 401 and a memory 402. The processor 401 is electrically connected to the memory 402.

The processor 401 is the control center of the terminal 400 and is connected to various parts of the terminal 400 through various interfaces and buses. The processor 401 could execute or load the applications stored in the memory 402 and read the data stored in the memory 402 to perform all kinds of functions of the terminal 400 and process data such that the processor 401 could monitor the entire terminal 400.

In this embodiment, the processor 401 in the terminal 400 follows the steps to load the corresponding instructions of one or more application into the memory 402, and the processor 401 executes the applications stored in the memory 402 to perform all kinds of functions.

The memory 402 could be used to store applications and data. The applications stored in the memory 402 contain instructions that could be executed in the processor 401. The applications can form all kinds of functional modules. The processor 401 executes instructions to perform operations comprising:

under a condition that a request of a video call initiated by a calling terminal is received, detecting whether a current terminal is in a video calling state;

under a condition that the current terminal is in the video calling state, obtaining a first communication type of a current video call and a second communication type of the video call initiated by the calling terminal;

under a condition that the first communication type is different from the second communication type, then generating a prompt message on a current call interface, wherein the prompt message is configured to prompt the request of the video call initiated by the calling terminal; and under a condition that a response operation to the request of the video call is received, switching a current video call to a video call of the second communication type to establish a video call connection with the call terminal.

In some embodiments, the operation of detecting whether the current terminal is in the video calling state comprises:

obtaining a video call status table within a specified storage area, wherein the video call status table at least comprises: a video call type and its current call status; and iterating over the call status of each type of video call in the video call status table to determine whether the current terminal is in the video call state.

In some embodiments, after the operation of switching the current video call to the video call of the second communication type, the operations further comprise:

determining the call status in the video call status table as a target video call being in a calling state;

updating the call status of the target video call to being not in a calling state, and updating the call status of the switched current video call as being in a calling state.

In some embodiments, the operation of switching the current video call to the video call of the second calling type comprises:
  maintaining a communication connection of the current video call with an opposite terminal, and stopping a call data transmission with the opposite terminal, wherein the call data comprise at least voice data and image data; and
  receiving the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

In some embodiments, the operations further comprise:
  after detecting that the video call of the second communication type is completed, enabling the call data transmission with the opposite terminal and displaying the image data transmitted by the opposite terminal on the display screen.

In some embodiments, after detecting that the video call of the second communication type is completed, playing voice data transmitted by the opposite terminal through the speaker.

In some embodiments, the communication type of the video call comprises a communication type based on a voice channel and a communication type based on a data channel.

Figure 6:
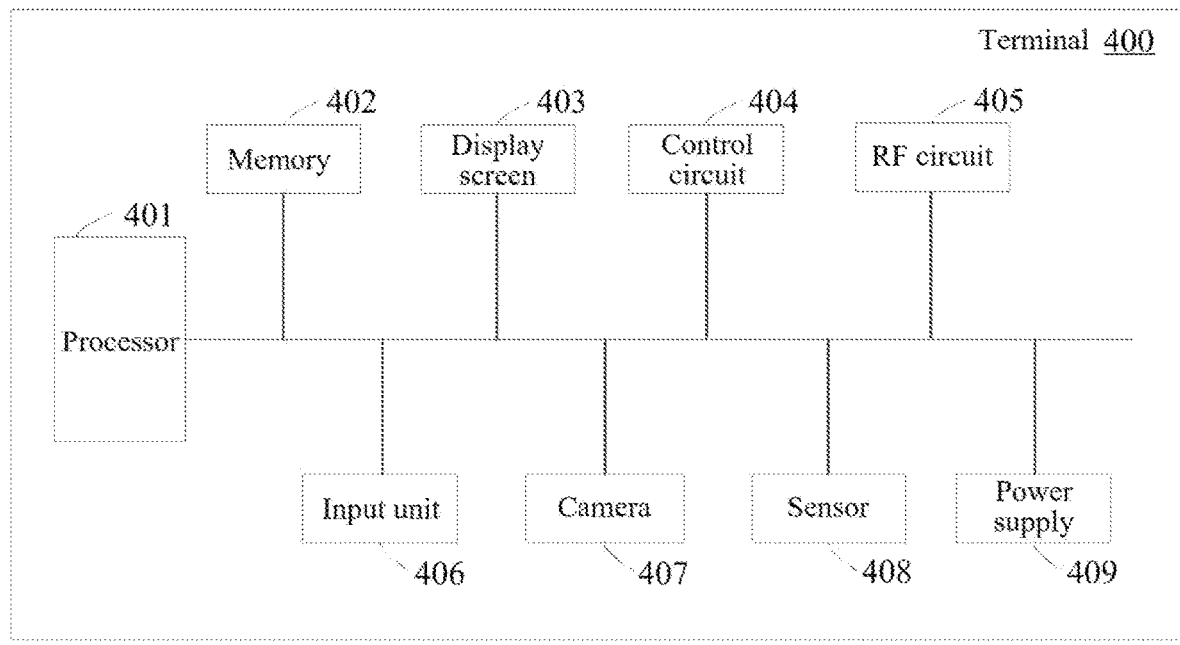
FIG. 6 is a diagram of another structure of a terminal according to an embodiment of the present disclosure.

As shown in FIG. 6, the terminal 400 further comprises a display screen 403, a control circuit 404, a radio-frequency (RF) circuit 405, an input unit 406, a sensor 408, and a power supply 409. The processor 401 is electrically connected to the display screen 403, the control circuit 404, the RF circuit 405, the input unit 406, the sensor 408, and the power supply 409.

The display screen 403 may be used to display information input by the user or information provided to the user or various graphical user interfaces of the terminal, which includes images, texts, icons, videos, and any combination thereof.

The control circuit 404 electrically connected to the display screen 403, is used to display information.

The RF circuit 405 is used for transmitting and receiving radio frequency signals, so as to establish wireless communication with the terminal or other terminals through wireless communication, thereby communicating with the server or other terminals.

The input unit 406 may be used to receive input numbers, character information, or user characteristic information (e.g., fingerprints), and generate keyboard, mouse, joystick, optical, or trackball signal input related to user settings and function control. The input unit 406 may include a fingerprint identification module.

The camera 407 can be used to collect image information. The camera may be a camera with one lens, or two or more lenses.

The sensor 408 is used to collect external environment information. The sensor 408 may include an ambient brightness sensor, an acceleration sensor, a light sensor, a motion sensor, and other sensors.

The power supply 409 is used to supply power to components of the terminal 400. In some embodiments, the power supply 409 may be connected to the processor 401 through a power management system, so as to implement functions such as managing charging, discharging, and power consumption through the power management system.

Although not shown in FIG. 6, the terminal 400 may further include a speaker, a Bluetooth module, and the like, which will not be repeated here.

According to an embodiment of the present disclosure, the video switching method and the related terminal detects whether a current terminal is in a video calling state under a condition that a request of a video call initiated by a calling terminal is received; obtains a first communication type of a current video call and a second communication type of the video call initiated by the calling terminal under a condition that the current terminal is in the video calling state; generates a prompt message on a current call interface, wherein the prompt message is configured to prompt the request of the video call initiated by the calling terminal under a condition that the first communication type is different from the second communication type; and switches a current video call to a video call of the second communication type to establish a video call connection with the call terminal under a condition that a response operation to the request of the video call is received. Accordingly, when a CS/ViLTE video call and an OTT video call appear at the same time, the user can freely select and switch, thereby improving the effectiveness and practicality of the video calls.

In some embodiments, a computer-readable storage medium is disclosed. The computer-readable storage medium stores a plurality of instructions, which could be executed by a processor to perform the aforementioned video call switching method.

Those having ordinary skill in the art can understand that all or part of the steps in the various methods of the above embodiments can be completed by instructing relevant hardware through a program, and the program can be stored in a computer-readable storage medium, and the storage medium can include: Read only memory (ROM), random access memory (RAM), magnetic disk or optical disk, etc.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A video call switching method performed by a terminal, comprising:
  obtaining a video call status table, wherein the video call status table comprises: a plurality of video call types, a plurality of video calling applications, and current call status;
  under a condition that a request of a video call initiated by a calling terminal is received, iterating over the call status of each type of video call in the video call status table to determine whether the current terminal is in the video call state;
  under a condition that the current terminal is in the video calling state, obtaining a first communication type of a current video call and a second communication type of the video call initiated by the calling terminal;
  under a condition that the first communication type is different from the second communication type, then generating a prompt message on a current call interface, wherein the prompt message is configured to prompt the request of the video call initiated by the calling terminal; and
  under a condition that a response operation to the request of the video call is received, switching a current video call to a video call of the second communication type to establish a video call connection with the call terminal.

2. The video call switching method of claim 1, further comprising following steps after the step of switching the current video call to the video call of the second communication type:
   determining the call status in the video call status table as a target video call being in a calling state; and
   updating the call status of the target video call to being not in a calling state, and updating the call status of the switched current video call as being in a calling state.

3. The video call switching method of claim 2, wherein the step of switching the current video call to the video call of the second calling type comprises:
   maintaining a communication connection of the current video call with an opposite terminal, and stopping a call data transmission with the opposite terminal, wherein the call data comprise at least voice data and image data; and
   receiving the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

4. The video call switching method of claim 3, further comprising:
   after detecting that the video call of the second communication type is completed, enabling the call data transmission with the opposite terminal and displaying the image data transmitted by the opposite terminal on the display screen.

5. The video call switching method of claim 4, further comprising a following step after detecting that the video call of the second communication type is completed:
   playing voice data transmitted by the opposite terminal through the speaker.

6. The video call switching method of claim 1, wherein the communication type of the video call comprises:
   a communication type based on a voice channel and a communication type based on a data channel.

7. A non-transitory computer-readable storage medium, storing a plurality of instructions, wherein the instructions are executed by a processor to perform operations comprising:
   obtaining a video call status table, wherein the video call status table comprises: a plurality of video call types, a plurality of video calling applications, and current call status;
   under a condition that a request of a video call initiated by a calling terminal is received, iterating over the call status of each type of video call in the video call status table to determine whether the current terminal is in the video call state;
   under a condition that the current terminal is in the video calling state, obtaining a first communication type of a current video call and a second communication type of the video call initiated by the calling terminal;
   under a condition that the first communication type is different from the second communication type, then generating a prompt message on a current call interface, wherein the prompt message is configured to prompt the request of the video call initiated by the calling terminal; and
   under a condition that a response operation to the request of the video call is received, switching a current video call to a video call of the second communication type to establish a video call connection with the call terminal.

8. The non-transitory computer-readable storage medium of claim 7, wherein after the operation of switching the current video call to the video call of the second communication type, the operations further comprise:
   determining the call status in the video call status table as a target video call being in a calling state; and
   updating the call status of the target video call to being not in a calling state, and updating the call status of the switched current video call as being in a calling state.

9. The non-transitory computer-readable storage medium of claim 8, wherein the operation of switching the current video call to the video call of the second calling type comprises:
   maintaining a communication connection of the current video call with an opposite terminal, and stopping a call data transmission with the opposite terminal, wherein the call data comprise at least voice data and image data; and
   receiving the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

10. The non-transitory computer-readable storage medium of claim 9, wherein the operations further comprise:
    after detecting that the video call of the second communication type is completed, enabling the call data transmission with the opposite terminal and displaying the image data transmitted by the opposite terminal on the display screen.

11. The non-transitory computer-readable storage medium of claim 10, wherein a following operation after detecting that the video call of the second communication type is completed:
    playing voice data transmitted by the opposite terminal through the speaker.

12. The non-transitory computer-readable storage medium of claim 7, wherein the communication type of the video call comprises:
    a communication type based on a voice channel and a communication type based on a data channel.

13. A terminal, comprising:
    a processor; and
    a memory, electrically connected to the processor, configured to store instructions and data;
    wherein the instructions are executed by the processor to perform operations comprising:
    obtaining a video call status table, wherein the video call status table comprises: a plurality of video call types, a plurality of video calling applications, and current call status;
    under a condition that a request of a video call initiated by a calling terminal is received, iterating over the call status of each type of video call in the video call status table to determine whether the current terminal is in the video call state;
    under a condition that the current terminal is in the video calling state, obtaining a first communication type of a current video call and a second communication type of the video call initiated by the calling terminal;

under a condition that the first communication type is different from the second communication type, then generating a prompt message on a current call interface, wherein the prompt message is configured to prompt the request of the video call initiated by the calling terminal; and under a condition that a response operation to the request of the video call is received, switching a current video call to a video call of the second communication type to establish a video call connection with the call terminal.

14. The terminal of claim 13, wherein after the operation of switching the current video call to the video call of the second communication type, the operations further comprise:

determining the call status in the video call status table as a target video call being in a calling state; and updating the call status of the target video call to being not in a calling state, and updating the call status of the switched current video call as being in a calling state.

15. The terminal of claim 14, wherein the operation of switching the current video call to the video call of the second calling type comprises:

maintaining a communication connection of the current video call with an opposite terminal, and stopping a call data transmission with the opposite terminal, wherein the call data comprise at least voice data and image data; and receiving the video call of the second communication type, transmitting the image data collected by a camera and voice data inputted through the microphone to the call terminal and simultaneously displaying the image data transmitted by the call terminal on a display screen and playing voice data transmitted by the call terminal through a speaker.

16. The terminal of claim 15, wherein the operations further comprise:

after detecting that the video call of the second communication type is completed, enabling the call data transmission with the opposite terminal and displaying the image data transmitted by the opposite terminal on the display screen.

17. The terminal of claim 16, wherein a following operation after detecting that the video call of the second communication type is completed:

playing voice data transmitted by the opposite terminal through the speaker.

* * * * *